United States Patent [19]

Wheat et al.

[11] Patent Number: 4,553,524
[45] Date of Patent: Nov. 19, 1985

[54] PORTABLE COOKING AND BARBECUING DEVICE

[76] Inventors: Don R. Wheat, 114 Cottonwood Trail, Durango, Colo. 81301; Don H. Coers, 1533 Heatherton Ct., Naperville, Ill. 60540

[21] Appl. No.: 529,498

[22] Filed: Sep. 6, 1983

[51] Int. Cl.[4] .............................................. A47J 37/00
[52] U.S. Cl. ........................ 126/25 R; 126/41 R; 126/50; 126/15 R
[58] Field of Search .................. 126/9 R, 39 D, 39 J, 126/41 R, 41 D, 15 R, 14, 25 R, 39 R, 215, 50; 99/451, 393, 396; 219/432, 429

[56] References Cited

U.S. PATENT DOCUMENTS

| | | | |
|---|---|---|---|
| 2,898,846 | 8/1959 | Del Francia | 126/15 R |
| 3,040,651 | 6/1962 | Nolte | 125/25 R |
| 3,217,634 | 11/1965 | Fox | 126/25 R |
| 3,430,621 | 3/1969 | Doty | 126/25 R |
| 3,500,813 | 3/1970 | Opdahl | 126/39 R |
| 3,759,164 | 9/1973 | Robinson | 126/215 |
| 4,089,258 | 5/1978 | Berger | 126/39 J |

*Primary Examiner*—William E. Lyddane
*Assistant Examiner*—Gerald A. Anderson

*Attorney, Agent, or Firm*—Marshall, O'Toole, Gerstein, Murray & Bicknell

[57] ABSTRACT

A portable, compact, gas-fired cooking and barbecuing device for frying and boiling food in conventional cooking utensils, or barbecuing food when a barbecuing attachment is utilized. The device includes a bowl-shaped body having a bottom and a relatively deep, cylindrical side wall. A gas burner assembly is mounted in the bowl-shaped body so that the annular burner of the assembly is positioned toward the bottom of the body to protect it from wind effects. Three circumferentially spaced, radially extending support members connect the burner to the cylindrical side wall of the bowl and serve as supports for cooking utensils in which food is to be fried or boiled. Mounting portions on the other ends of the support members extend above the upper edge of the body for supporting large sized cooking utensils. When the lower cylindrical portion of an annular barbecuing attachment is engaged with the support members of the burner assembly, food items may be barbecued on the barbecuing grill of the attachment. The diameter of the upper portion of the attachment is larger than the side wall of the bowl-shaped body to prevent food drippings from falling onto the bowl side wall.

7 Claims, 10 Drawing Figures

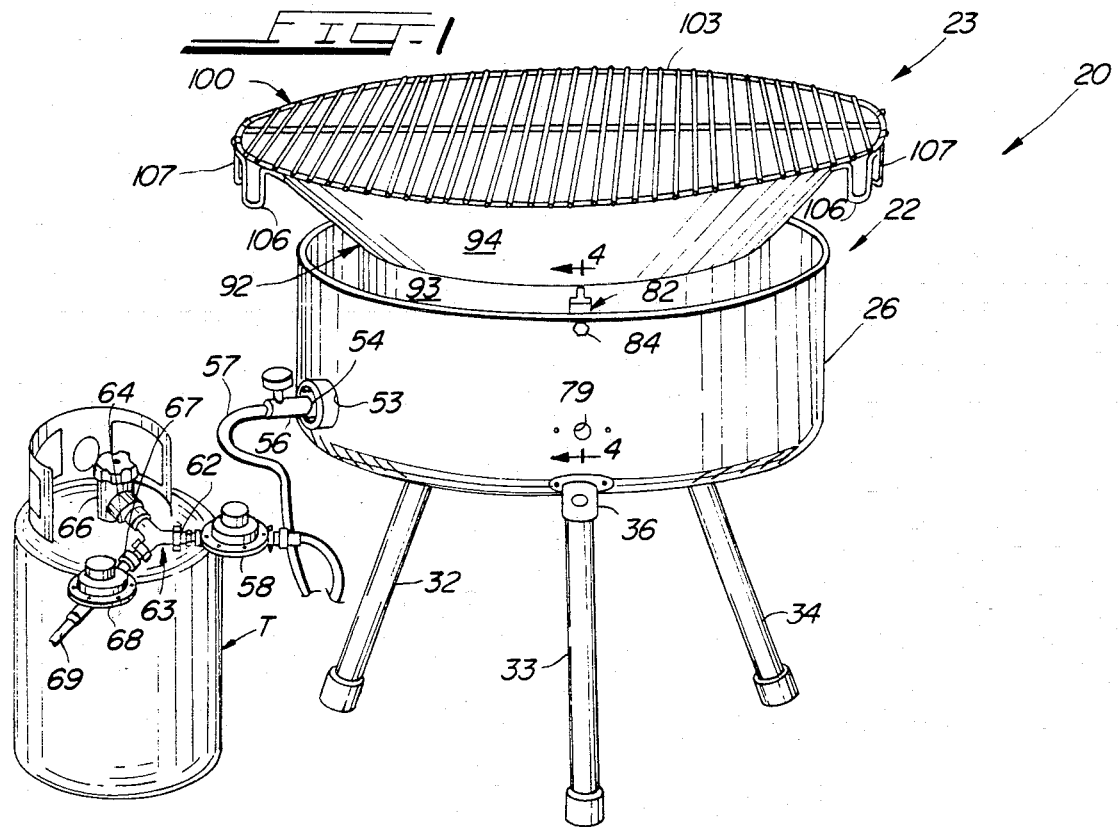
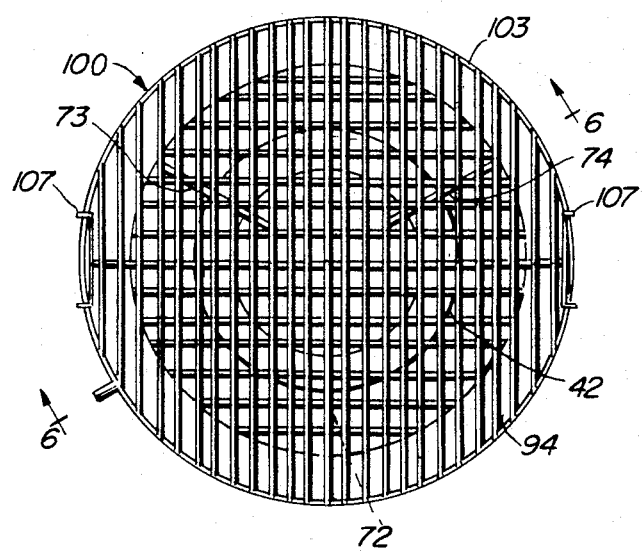
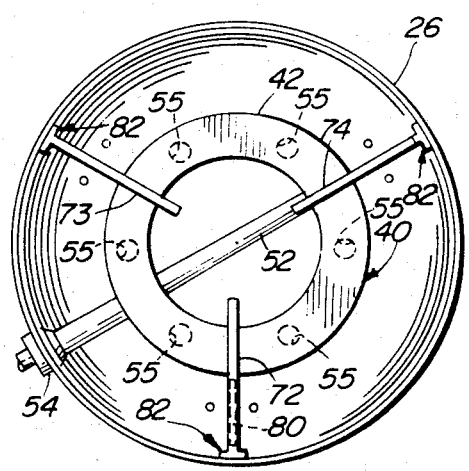

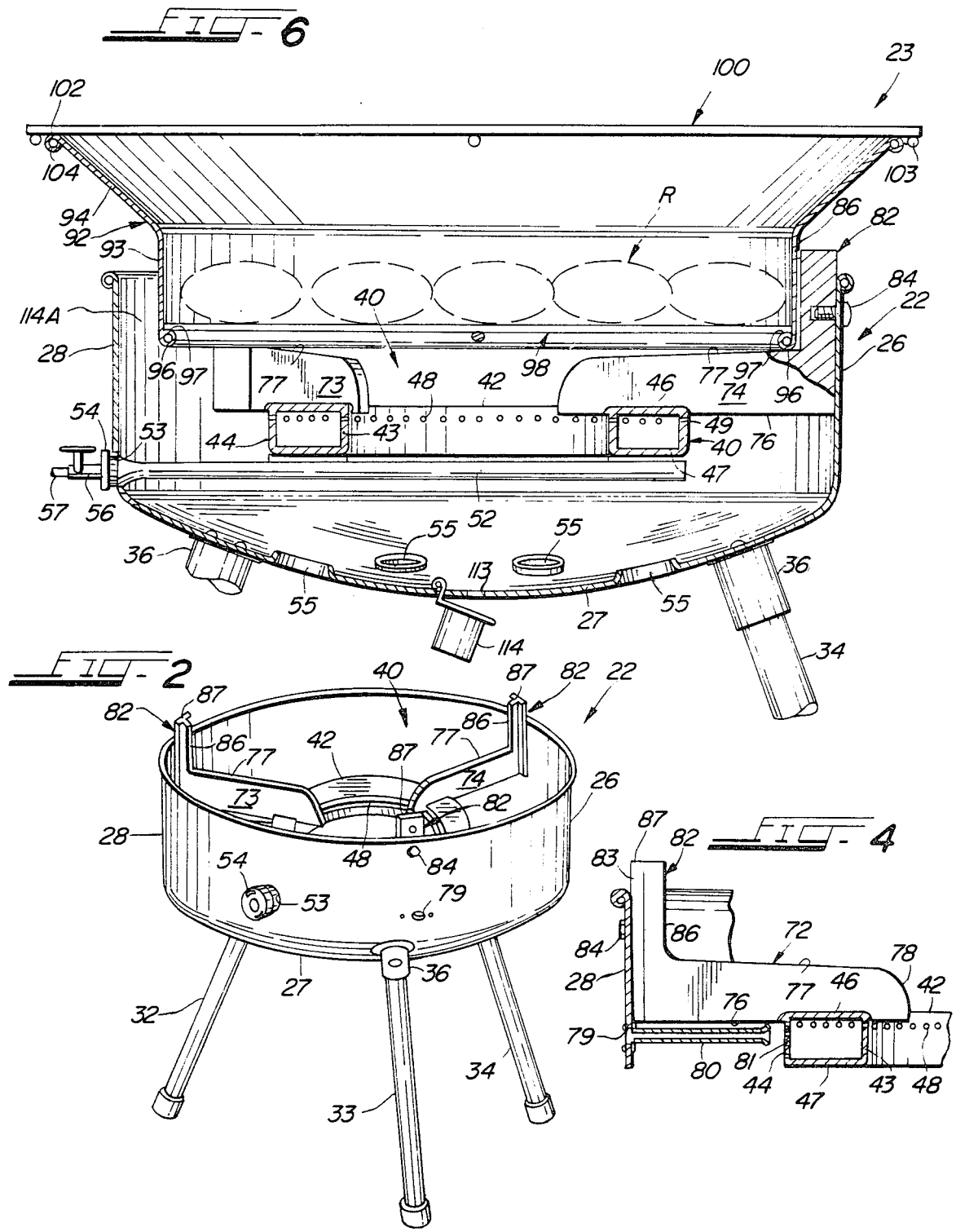

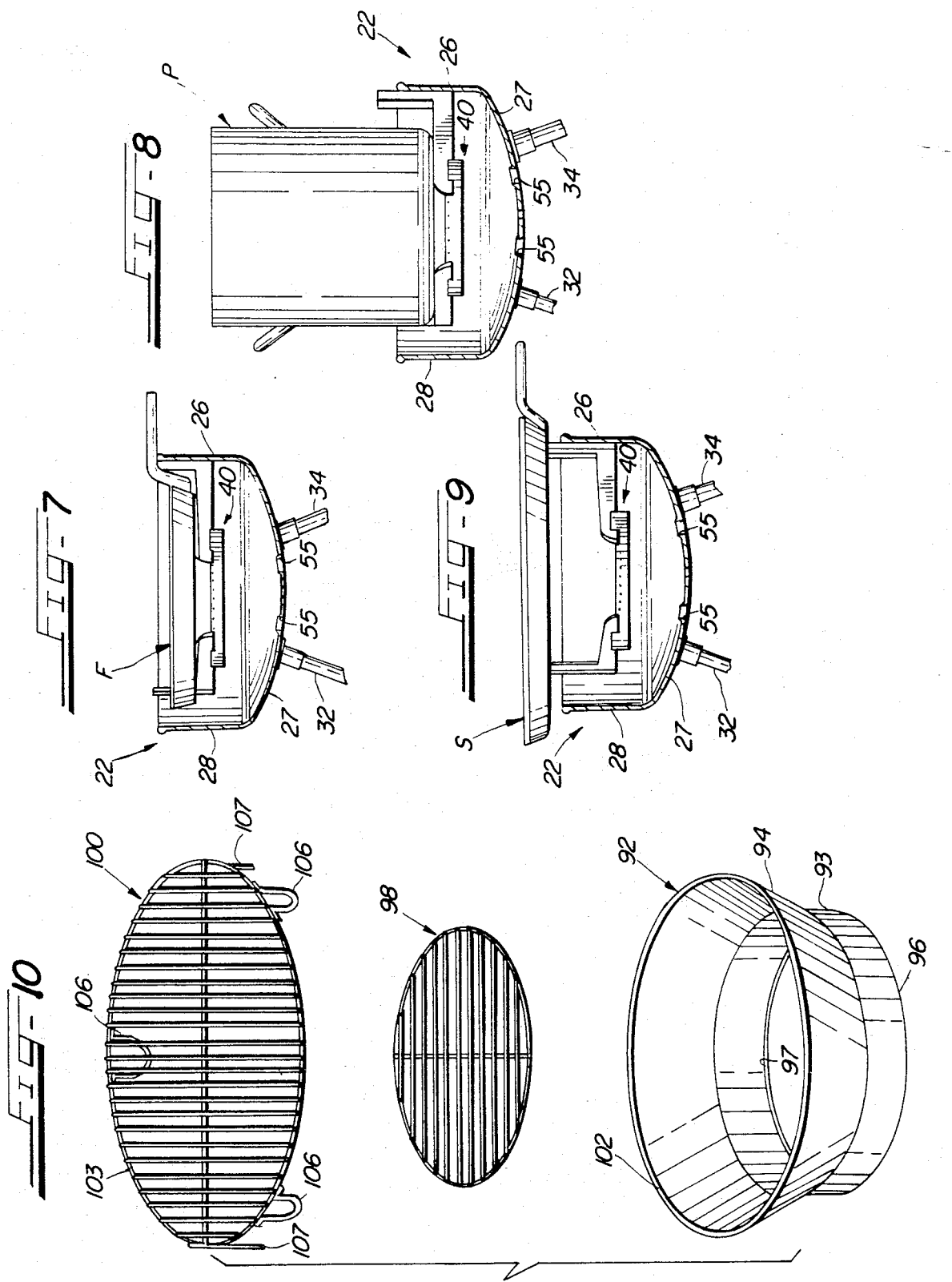

PORTABLE COOKING AND BARBECUING DEVICE

BACKGROUND OF THE INVENTION (1) Field of the Invention

This invention relates to portable cooking devices, and more particularly relates to a portable cooking device having a separable barbecuing attachment.

(2) Description of the Prior Art

Various types of portable cooking devices have been heretofore developed for both outdoor and indoor cooking. Such devices have used different fuel sources, such as charcoal briquettes, alcohol, and bottled gas, such as liquefied propane. While such devices generally accomplish their intended purpose, most are designed for a single purpose, such as barbecuing, broiling, frying, or boiling food, but could not effectively perform more than one of these functions. Consequently, a need has existed for a portable cooking device which is capable of efficiently cooking food in conventional cooking utensils, such as pots, frying pans, and the like, and which can also effectively broil or barbecue food on a grill when this type of cooking is desired.

A need has likewise existed for a portable gas-fired cooking device, which can be used outdoors and which is not adversely affected by the wind while in use.

A need has also existed for a portable cooking device for outdoor use by the owners or users of recreational vehicles in which bottled gas is utilized as the fuel source for the inside stoves of such vehicles, wherein the portable cooking device can be rapidly and easily connected to and disconnected from the same gas bottle as is used for the internal stove when it was desired to cook outdoors.

SUMMARY OF THE INVENTION

Briefly described, the present invention contemplates a portable, gas-fired cooking device which may be used to rapidly and efficiently cook food in conventional cooking utensils, such as pots, frying pans, kettles, and the like, and which may be simply and rapidly converted for use as a barbecue grill by engaging an attachment therewith. Thus, the cooking device, to be hereinafter described in detail, generally comprises a bowl-shaped body having a bottom and a relatively deep, upstanding, cylindrical side wall. A plurality of legs are connected to the bottom of the body and serve to support the device in an upright position on a horizontal surface, such as the ground or a table top, or the like.

A burner assembly is mounted in the bowl-shaped body, such assembly including an annular burner that is disposed generally adjacent to the bottom of the body, and a plurality of cirumferentially spaced support members extend radially between and connect the annular burner to the side wall of the body. A mixing tube is connected to the burner of the assembly and supplies a combustible mixture of air and gas to the burner. Supplemental air is supplied to the burner through openings in the bottom of the body.

The support members of the burner assembly support the burner thereof in centered relation in the body and also serve to support the bottom of a cooking utensil, such as a pot or frying pan, when either of these items is placed in the body and the burner is in operation. The radially outer ends of the support members include axially extending mounting portions, which are connected to the side wall of the body and which extend upwardly beyond the upper edge of the cylindrical side wall to engage the bottom of and support larger sized cooking utensils.

A separable barbecuing attachment, which includes an annular adapter having a lower, cylindrical portion of lesser diameter than the diameter of the cylindrical side wall of the bowl-shaped body, may be inserted into the body with the lower end of the adapter resting on the support members of the burner assembly. The adapter also includes an upper, frustoconical portion which extends upwardly and outwardly from the lower cylindrical portion and which has an upper end having a diameter equal to or greater than the diameter of the cylindrical side wall of the bowl-shaped body. The frustoconical portion of the adapter prevents drippings from food being cooked on a food supporting grill that rests on the upper end of the frustoconical portion from falling onto the cylindrical side wall of the bowl-shaped body. An internal shoulder on the lower end of the cylindrical portion of the adapter serves to support a radiant heat element grill on which pumice rocks or the like are arranged to burn off food drippings.

The lower cylindrical portion of the adapter is of lesser diameter than the cylindrical side wall of the bowl-shaped body so that an annular air gap is provided between the cylindrical portion of the adapter and the cylindrical side wall of the body. This gap permits supplemental air for the burner to flow downwardly in the gap in countercurrent relation to the upward flow from the burner, thereby to cool the cylindrical side wall of the body when the burner is in operation.

Accordingly, it is a general object of the present invention to provide a novel and improved compact, portable cooking device which may be effectively used to cook food in different types of cooking utensils and which may also be used to broil or barbecue food.

A more particular object is to provide a novel cooking device of the foregoing character, wherein a separable barbecuing attachment may be easily and rapidly engaged with the cooker portion of the device when it is desired to broil or barbecue food.

Another object is to provide a novel cooking device of the foregoing character, which is substantially uneffected by wind gusts when in operation.

A further object is to provide a novel, portable cooking device for use by the owners or users of recreational vehicles and which can be rapidly and easily connected to the same bottled gas fuel source as is used for the internal stove of such vehicles.

These and other objects will become apparent from the following detailed description and accompanying drawings.

DESCRIPTION OF THE DRAWINGS

FIG. 1 is a perspective view of a portable cooking device embodying the features of the present invention and showing the latter as it would appear when the barbecuing attachment thereof is engaged with the bowl-shaped body of the device and a bottle of liquefied gas is connected to the burner thereof;

FIG. 2 is a perspective view of the cooker portion of the device illustrated in FIG. 1 but without the barbecuing attachment removed from the bowl-shaped body;

FIG. 3 is a somewhat reduced, top plan view of the cooker portion of the device illustrated in FIG. 2;

FIG. 4 is a fragmentary, vertical sectional view, taken substantially along the line 4—4 of FIG. 1;

FIG. 5 is a somewhat reduced, top plan view of the cooking device and barbecuing attachment of the present invention as illustrated in FIG. 1;

FIG. 6 is an enlarged, vertical sectional view, taken substantially along the line 6—6 of FIG. 5;

FIGS. 7 and 8 are cross sectional views, with some parts in elevation and others broken away, through the cooker portion of the device of the present invention and showing the approximate positions that a small sized frying pan and boiling pot would occupy when resting on the burner of the device;

FIG. 9 is a cross sectional view, similar to FIGS. 7 and 8, showing the approximate position that a large sized frying pan would occupy when resting on the burner; and FIG. 10 is an exploded perspective view of the barbecue attachment illustrated in FIGS. 1, 5 and 6.

DESCRIPTION OF THE PREFERRED EMBODIMENTS

Referring initially to FIG. 1, a portable cooking device embodying the features of the present invention, is illustrated and indicated generally at 20. The device 20 incluedes a cooker, indicated generally at 22, and a barbecuing attachment, indicated generally at 23, which is shown as it would appear when operably engaged with the cooker 22. The construction and operation of the cooker 22 will be described before describing the construction and operation of the attachment 23.

Referring now to FIGS. 2 and 3 in conjunction with FIG. 1, it will be seen that the cooker 22 generally comprises a bowl-shaped body 26 having a downwardly convex bottom 27 and a relatively deep, upstanding, cylindrical side wall 28. Means in the form of at least one and preferably three equidistantly circumferentially spaced, diverging legs 32, 33, and 34, is provided for supporting the body 26 on a horizontal surface, such as the ground, a patio, or the like. The legs 32–34 are preferably removably engaged in sockets 36 on the bottom 27 of the body 26 by threaded fasteners (not shown). While the legs 32–34 are approximately ten inches in length when engaged in their mounting sockets 36, longer length legs could be used. When the cooker is to be used on an elevated horizontal surface, such as a table top, only the sockets 36 need be used to support the body 26.

According to the present invention, a source of heat is provided in the bowl-shaped body 26. Such source, in the present instance, comprises a gas burner assembly 40 that is preferably disposed generally adjacent to the bottom 27 of the bowl-shaped body 26. The burner assembly 40 includes an annular gas burner 42 having circumferentially spaced, radially inner and outer side walls 43 and 44 (FIGS. 4 and 6), and top and bottom walls 46 and 47. A ring of openings 48 (FIGS. 2 and 6) are provided in the inner wall 43 and another ring of openings 49 are provided in the outer wall 44.

Gas is supplied to the interior of the burner 42 from an elongated mixing tube 52, which communicates with the interior of the burner 42 by passages (not shown). The tube 52 extends through an opening 53 in the side wall 28 of the body 26, and a conventional air and gas mixture control plate 54 and flow control valve 56 are provided on the outer end of the tube for regulating the volume of gas supplied to the burner 42.

At least one and preferably a ring of openings, each of which is indicated at 55 in FIGS. 3, 6, and 7–9, inclusive, are provided in the bottom 27 of the body 26 to supply additional air to the burner 42. The margins of the openings 55 are bent upwardly above the inner surface of the bottom 27 to prevent liquefied grease and fat from flowing through these openings.

As best seen in FIG. 1, a hose 57 is connected at one end to the burner control valve 56 and the opposite end of the hose is shown connected to a pressure regulator 58. The pressure regulator 58 is in turn connected to one arm 62 of a Y fitting 63, the common supply arm 64 of which is connected to the outlet fitting, indicated at 66, of a conventional liquid propane tank, indicated generally at T. The other arm, indicated at 67, of the Y fitting 63 is shown connected to another pressure regulator 68 and the fragment, indicated at 69, of another hose. The opposite end of the hose 69 could be connected to another cooking device, such as the device 20, or to the permanently installed stove of a recreational vehicle. In the latter application of the invention, the propane tank T would be mounted in its customary external location on the vehicle with the Y fitting 63 threaded into the tank fitting 66. When not in use, either the hose 57 and/or the pressure regulator 58 are disconnected from the arm 62 of the Y fitting 63 and a plug (not shown) is threaded into the arm 62. In nonrecreational vehicle uses of the device 20, the Y fitting 63 might not be needed.

The pressure regulator 58 is adjusted to maintain a gap pressure of about 2 p.s.i.g. in the hose 57. This pressure increases the velocity of the gas through the venturi throat of the mixing tube 52 and permits the throat area of the venturi in the mixing tube 52 to be reduced. Consequently, the flame from the burner 42 is stabilized and the effects of wind at the air entrance ports in the mixture adjusting plate 54 are minimized.

As previously described, the burner 42 is generally located adjacent to the bottom 27 of the bowl-shaped body 26 and centered within the annular side wall 28. To this end, at least one and preferably a plurality of elongated support members extend between and connect the burner 42 with the side wall 28. In the present instance, three circumferentially spaced, radially extending support members 72, 73, and 74 are provided for this purpose. As best seen in FIGS. 2, 3, 4, and 6, each of the support members 72–74 is generally of elongated, plate-like form having generally radially extending lower and upper edges 76 and 77, and radially inner ends 78. The upper edges 77 preferably slant somewhat dowwnwardly toward the center of the body 26 and provide a stable support for cooking utensils placed in the body, such as frying pans, pots, and the like.

The radially outer end of each of the support members 72–74 terminates in a vertically extending mounting portion, indicated generally at 82, which includes a plate portion 83 that engages the inner surface of the side wall 28 and is secured thereto as by a screw 84. The screw 84 extends through an opening (not shown) in the side wall 28 and is threaded into the mounting portion 82.

The top wall 46 of the burner 42 is carried on the lower edge 76 of the support members 72–74 so that the burner lies below the support members. In this regard, the burner 42 could be formed separately from the support members 72–74 and secured thereto with conventional fasteners. However, at least the annular top wall 46 of the burner 42 is preferably formed integrally with the support members 72–74, as a single casting, and the lower portion of the burner, which includes the inner and outer side walls 43 and 44 of the bottom 47, is preferably formed as a separate casting, which is subsequently welded to the top wall 46.

In order to facilitate ignition of the burner 42 after the hose 57 is connected to the propane tank T and the valve 56 opened, an opening 79 is provided in the side wall 28 and the outer end of an igniting tube 80 (FIG. 4), which underlies the support member 72, is secured to the side wall 28 with such outer end registering with the opening 79. The inner end of the ignition tube is positioned close to one or more bleed openings 81 in the outer wall 44 of the burner. Thus, when the valve 56 is opened, the burner 40 can be conveniently ignited by holding a burning match or cigarette lighter close to the opening 79.

With the foregoing construction it will now be apparent that the cooker 22 of the device 20 may be employed to cook food items in small utensils such as frying pans, pots, and the like, by resting the utensil with the food therein, on the upper edges 77 of the support members 72–74, inclusive, as indicated by the position of the frying pan, indicated generally at F in FIG. 7, and by the boiling pot, indicated generally at P in FIG. 8. The frying pan F is generally representative of smaller frying pans which range in diameter up to approximately fourteen inches.

FIG. 9 illustrates the approximate position that a large sized skillet, indicated as S, would occupy when engaged with the cooker 22. It will be assumed that the diameter of the skillet S is greater than that which will fit between the inner vertical edges, indicated at 86 in FIGS. 2, 4, and 6, of the mounting portions 82, the skillet S is supported on the upper ends, indicated at 87, of the mounting portions 82.

As previously mentioned, the cooking device 20 includes the barbecuing attachment 23 which permits food to be barbecued or broiled when it is desired to do this type of cooking. As best seen in FIG. 10, the barbecuing attachment 23 includes an annular adapter member 92 having a lower, cylindrical portion 93 and integral, upper, frustoconical portion 94, which extends upwardly and outwardly from the cylindrical portion 93. The diameter of the cylindrical portion 93 is preferably somewhat less than that defined by the inner vertical edges 86 of the mounting portions 82 so that the cylindrical portion 93 can be inserted into the bowl-shaped body 26 with the annular, lower end 96 of the cylindrical portion 93 resting on the upper edges 77 of the support members 72–74.

The lower end 96, in the present instance, is rolled inwardly to form an inturned head or shoulder 97 (FIG. 6), which serves to support an annular grill 98. The grill 98 serves as a retainer for a plurality of heat absorbing and radiating elements, such as pumice rocks, indicated generally at R in FIG. 6. A sufficient number of the rocks are placed on the grill 98 to cover the same and vaporize and/or absorb drippings from food items (not shown) resting on another and larger grill, indicated generally at 100. The grill 100 rests on and is supported by the upper end 102 of the adapter member 92.

As will be apparent from FIGS. 1, 5, and 10, the diameter of the grill 100 is somewhat greater than that of the upper end 102 of the upper frustoconical portion 94 so that the peripheral ring portion, indicated at 103, of the grill 100 circumscribes and is retained by an outwardly rolled over portion or bead 104 around the upper end 102. The grill 103 is also retained on the upper end 102 of the frustoconical portion 94 by at least one and preferably three equidistantly circumferentially spaced, U-shaped brackets 106 which are secured in depending relation to the peripheral ring portion 103 of the grill 100. A pair of diametrically arranged, generally U-shaped handles 107 are pivotally connected at their bifurcated ends to the ring portion 103 of the grill 100 to permit a user to lift the grill 100, and any items resting thereon, upwardly away from the upper end 102 of the adapter 92, when desired.

When the attachment 23 is engaged with the cooker 22, as illustrated in FIGS. 1 and 6, and one or more food items (not shown) are resting and being barbecued on the grill 100, the drippings from the food items disposed toward the peripheral ring 103 of the grill 100 will fall onto the inner surface of the frustoconical portion 94 and be directed by the cylindrical skirt portion 93 toward the bottom 27 of the cooker body 26. Such drippings will then flow inwardly toward a drain hole 113 in the center of the bottom 27 from which they will drop into a suitable receptacle, such as a can 114 that is supported below the drain hole 113. Drippings from the food being barbecued which fall downwardly onto the heat absorbing rocks R are either burned or vaporized.

As previously mentioned, the diameter of the lower, cylindrical portion 93 of the adapter 92 is less than that of the side wall 28 so that the outer surface of the cylindrical portion 93 is disposed closely adjacent to the inner vertical edges 86 of the mounting portions 82 when the attachment 23 is engaged with the burner assembly 40, as illustrated in FIGS. 1 and 6. Consequently, an annular gap, a portion 114A of which is indicated in FIG. 6, is defined between the outer surface of the lower cylindrical portion 93 of the attachment and the inner surface of the cylindrical side wall 28. The gap 114A serves as a duct for directing supplemental air to the burner 42, in addition to the flow through the openings 55, when the burner 42 is in operation. This supplemental air flow also serves to cool the outer cylindrical wall 28 of the bowl-shaped body 26 and the handles 107 of the grill 100. Thus, the likelihood of someone being burned by accidentally grasping the side wall 28 or the handles 107 without protective gloves or the like, is substantially reduced.

While the attachment 23 is particularly suited for use with the cooker 22, it could also be adapted for use with conventional barbecue grills by providing connecting pieces or brackets on the outer surface of the cylindrical portion 93 which would permit the attachment to rest upon the upper edge of the annular side wall of a conventional barbecue grill, thereby achieving most of the advantages obtained when the attachment 23 is used with the cooker 22.

While the cooker 26 has been herein illustrated with legs 32–34 of approximately ten inches in length, it is contemplated that longer length legs, such as nineteen inch legs, could be used in place of the legs 32–34.

While one or more embodiments of the invention have been herein illustrated and described in detail, it will be understood that modifications and variations thereof could be developed which do not depart from the spirit of the invention and the scope of the appended claims.

We claim:

1. A portable cooking device comprising a bowl-shaped body having a bottom and an upstanding cylindrical side wall, means carried by said body for supporting the body in an upright position on a horizontal surface, an annular burner, means for supplying a combustible mixture of air and gas to said burner, at least one elongated support member connected to said burner and said side wall and supporting said burner in said body generally adjacent to the bottom thereof so that the flame of said burner is protected from the effects of wind during cooking, an annular adapter member having upper and lower ends, said lower end resting on said support member, the diameter of the lower end of said adapter member being greater than the diameter of said burner and less than the diameter of said cylindrical side wall so that an annular gap is defined between said cylindrical side wall and the lower end of said adapter member, and a food supporting grill resting on the upper end of said adapter member, whereby said adapter member is effective to direct heat from said burner upwardly through said food supporting grill to cook food resting thereon and the gap between the cylindrical side wall and the lower end of said adapter member permits air to flow downwardly through said gap when said burner is in operation in countercurrent relation to the upward flow from said burner to cool said cylindrical side wall and to supply additional air to said burner.

2. The portable cooking device of claim 1, in which a plurality of said elongated support members extend between and connect said burner to said cylindrical side wall, said support members are arranged in generally radially extending, circumferentially spaced relation, and the lower end of said adapter member rests on and is supported by each of said support members.

3. The portable cooking device of claim 1, in which at least one opening is provided in the bottom of said bowl-shaped body for supplying supplemental air to said burner.

4. The portable cooking device of claim 3, in which a ring of said openings is provided in said bottom in substantially underlying relation to said annular burner.

5. A portable cooking device comprising:

a bowl-shaped body having a bottom and an upstanding cylindrical side wall;

means carried by the body for supporting it in an upright position on a horizontal surface;

a burner;

means for supplying a combustible mixture of air and gas to the burner;

support means connected to the burner and the body for supporting the burner in the body generally adjacent to the lower portion thereof so that a flame from the burner is protected from the effects of wind during cooking;

a grill adapter wider than the width of the burner;

means removably supporting the grill adapter in position above the burner so that heat from the burner can grill food on the grill adapter;

the grill adapter having a pair of substantially horizontally positioned and vertically spaced apart grating elements and means effectively interconnecting the grating elements so as to be movable as a unit;

a plurality of rocks for radiating heat located between the pair of grating elements and simultaneously removable with the grill adapter from the cooking device; and the cooking device having pot or pan support means for supporting the bottom of a pot or pan above the burner when the grill adapter is removed from the cooking device and the cooking device is to be used for cooking food as distinguished from grilling food.

6. A portable cooking device according to claim 5 in which the support means connected to the burner and the cooking device body includes means adapted to support a pot or pan above the burner when the grill adapter is removed.

7. A portable cooking device according to claim 5 in which the support means connected to the burner and the cooking device body supports the grill adapter.

* * * * *